United States Patent
Bowling

(10) Patent No.: US 11,263,324 B2
(45) Date of Patent: Mar. 1, 2022

(54) MONITORING SOURCE CODE REPOSITORY DATA IN REAL-TIME TO PROTECT SENSITIVE INFORMATION AND PROVIDE ENTITY-SPECIFIC ALERTS

(71) Applicant: Bank of America Corporation, Charlotte, NC (US)

(72) Inventor: John Ryan Bowling, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 287 days.

(21) Appl. No.: 16/574,619

(22) Filed: Sep. 18, 2019

(65) Prior Publication Data

US 2020/0387607 A1    Dec. 10, 2020

Related U.S. Application Data

(60) Provisional application No. 62/857,042, filed on Jun. 4, 2019.

(51) Int. Cl.

| | | |
|---|---|---|
| *G06F 21/56* | (2013.01) | |
| *G06F 21/62* | (2013.01) | |
| *G06F 21/12* | (2013.01) | |
| *G06F 21/31* | (2013.01) | |
| *G06F 21/57* | (2013.01) | |

(52) U.S. Cl.
CPC ............ *G06F 21/563* (2013.01); *G06F 21/12* (2013.01); *G06F 21/31* (2013.01); *G06F 21/57* (2013.01); *G06F 21/6245* (2013.01); *G06F 21/6218* (2013.01)

(58) Field of Classification Search
CPC ...... G06F 21/563; G06F 11/302; G06F 21/12; G06F 21/31; G06F 21/57; G06F 21/56; G06F 21/62; G06F 21/6218; G06F 21/6245

See application file for complete search history.

(56) References Cited

U.S. PATENT DOCUMENTS

| | | |
|---|---|---|
| 7,114,183 B1 | 9/2006 | Joiner |
| 8,266,697 B2 | 9/2012 | Coffman |

(Continued)

*Primary Examiner* — Jayesh M Jhaveri
(74) *Attorney, Agent, or Firm* — Banner & Witcoff, Ltd.

(57) ABSTRACT

Aspects of the disclosure relate to monitoring source code repository data in real-time to protect sensitive information and provide entity-specific alerts. A computing platform may receive configuration information defining one or more criteria for identifying sensitive data of an enterprise organization. The computing platform may monitor external code repository server infrastructure based on the configuration information. In response to detecting that first source code received by the external code repository server infrastructure contains first sensitive information associated with the enterprise organization, the computing platform may generate a notification comprising information indicating that the first sensitive information associated with the enterprise organization has been detected at the external code repository server infrastructure. Subsequently, the computing platform may send the notification to an enterprise administrator user computing device associated with the enterprise organization.

20 Claims, 8 Drawing Sheets

(56) References Cited

U.S. PATENT DOCUMENTS

| | | | |
|---|---|---|---|
| 8,793,790 B2 | 7/2014 | Khurana et al. | |
| 8,868,728 B2 | 10/2014 | Margolies et al. | |
| 8,918,867 B1* | 12/2014 | Salour | G06F 21/6245 726/22 |
| 9,009,834 B1* | 4/2015 | Ren | G06F 21/6209 726/24 |
| 9,038,187 B2 | 5/2015 | McHugh et al. | |
| 9,043,905 B1 | 5/2015 | Allen et al. | |
| 9,141,790 B2 | 9/2015 | Roundy et al. | |
| 9,166,997 B1 | 10/2015 | Guo et al. | |
| 9,256,739 B1 | 2/2016 | Roundy et al. | |
| 9,589,245 B2 | 3/2017 | Coden et al. | |
| 9,641,544 B1 | 5/2017 | Treat et al. | |
| 9,680,855 B2 | 6/2017 | Schultz et al. | |
| 9,727,821 B2 | 8/2017 | Lin et al. | |
| 9,729,567 B2 | 8/2017 | Silva et al. | |
| 9,894,036 B2 | 2/2018 | Weinberger et al. | |
| 9,894,088 B2 | 2/2018 | Ward et al. | |
| 9,900,336 B2 | 2/2018 | Beauchesne et al. | |
| 10,003,608 B2 | 6/2018 | Treat et al. | |
| 10,015,175 B2 | 7/2018 | Kent et al. | |
| 10,050,985 B2 | 8/2018 | Mhatre et al. | |
| 10,084,806 B2 | 9/2018 | Ward et al. | |
| 10,225,288 B2 | 3/2019 | Haugsnes | |
| 10,248,532 B1* | 4/2019 | Wasiq | G06F 11/3452 |
| 10,699,023 B1* | 6/2020 | Mokashi | G06F 21/6245 |
| 10,803,188 B1* | 10/2020 | Rajput | H04L 51/12 |
| 2016/0132694 A1* | 5/2016 | Dhoolia | G06F 21/602 713/165 |
| 2017/0235568 A1* | 8/2017 | Cowan | G06F 8/73 717/122 |
| 2017/0330117 A1 | 11/2017 | Dean et al. | |
| 2018/0027006 A1* | 1/2018 | Zimmermann | H04L 63/0245 726/11 |
| 2019/0281064 A1 | 9/2019 | Patrich et al. | |
| 2019/0281066 A1 | 9/2019 | Simons | |
| 2019/0281067 A1 | 9/2019 | Linnakangas et al. | |
| 2019/0281080 A1 | 9/2019 | Chen | |
| 2019/0281082 A1 | 9/2019 | Carmichael | |
| 2019/0281107 A1 | 9/2019 | Banerjee et al. | |
| 2019/0281108 A1 | 9/2019 | Glommen et al. | |
| 2019/0281126 A1 | 9/2019 | Gosalia | |
| 2019/0281134 A1 | 9/2019 | Suresh | |
| 2019/0281153 A1 | 9/2019 | Merjanian et al. | |
| 2019/0281159 A1 | 9/2019 | Segalis et al. | |
| 2019/0281168 A1 | 9/2019 | Raleigh | |
| 2019/0281189 A1 | 9/2019 | Watts et al. | |
| 2019/0281200 A1 | 9/2019 | Files et al. | |
| 2019/0281249 A1 | 9/2019 | Grafton et al. | |
| 2019/0281259 A1 | 9/2019 | Palazzolo | |
| 2019/0281306 A1 | 9/2019 | Smith et al. | |
| 2019/0281349 A1 | 9/2019 | Harkness et al. | |
| 2019/0281371 A1 | 9/2019 | Klicpera | |
| 2019/0281389 A1 | 9/2019 | Gordon et al. | |
| 2019/0281456 A1 | 9/2019 | Kelts et al. | |
| 2019/0281460 A1 | 9/2019 | Yin et al. | |
| 2019/0281463 A1 | 9/2019 | Raleigh | |
| 2019/0281465 A1 | 9/2019 | Moshir et al. | |
| 2019/0281468 A1 | 9/2019 | Mathison et al. | |
| 2019/0281485 A1 | 9/2019 | da Silva et al. | |
| 2019/0281494 A1 | 9/2019 | Chan et al. | |
| 2019/0281516 A1 | 9/2019 | Viox et al. | |
| 2019/0281572 A1 | 9/2019 | Das et al. | |
| 2019/0281725 A1 | 9/2019 | Byers et al. | |

\* cited by examiner

US 11,263,324 B2

MONITORING SOURCE CODE REPOSITORY DATA IN REAL-TIME TO PROTECT SENSITIVE INFORMATION AND PROVIDE ENTITY-SPECIFIC ALERTS

CROSS-REFERENCE TO RELATED APPLICATIONS

This application claims the benefit of and priority to U.S. Provisional Patent Application Ser. No. 62/857,042, filed Jun. 4, 2019, and entitled "Monitoring Source Code Repository Data in Real-Time to Protect Sensitive Information and Provide Entity-Specific Alerts," which is incorporated by reference herein in its entirety.

BACKGROUND

Aspects of the disclosure relate to deploying digital data processing systems, providing information security, and preventing unauthorized access to secure resources of information systems. In particular, one or more aspects of the disclosure relate to monitoring source code repository data in real-time to protect sensitive information and provide entity-specific alerts.

Enterprise organizations may utilize various computing infrastructure to maintain large data sets, which may include confidential information and/or other sensitive data that is created and/or used for various purposes. Ensuring that this confidential information and/or other sensitive data remains within the enterprise organization and under the control of the enterprise organization may be critically important to protecting the integrity and confidentiality of the underlying information, as well as to ensuring privacy and security for enterprise users and customers. In some instances, however, it may be difficult to ensure the integrity and confidentiality of the information associated with enterprise data sets while also attempting to optimize the resource utilization, bandwidth utilization, and efficient operations of the computing infrastructure involved in maintaining and controlling access to the data, particularly in instances where software developers associated with an enterprise organization utilize one or more external source code repositories.

SUMMARY

Aspects of the disclosure provide effective, efficient, scalable, and convenient technical solutions that address and overcome the technical problems associated with ensuring information security and preventing unauthorized access to resources of enterprise computer systems by monitoring source code repository data in real-time to protect sensitive information and provide entity-specific alerts.

In accordance with one or more embodiments, a computing platform having at least one processor, a communication interface, and memory may receive, via the communication interface, from an enterprise administrator user computing device associated with an enterprise organization, configuration information defining one or more criteria for identifying sensitive data of the enterprise organization. Subsequently, the computing platform may monitor external code repository server infrastructure based on the configuration information defining the one or more criteria for identifying the sensitive data of the enterprise organization. Based on monitoring the external code repository server infrastructure, the computing platform may detect that first source code received by the external code repository server infrastructure contains first sensitive information associated with the enterprise organization. In response to detecting that the first source code received by the external code repository server infrastructure contains the first sensitive information associated with the enterprise organization, the computing platform may generate a notification comprising information indicating that the first sensitive information associated with the enterprise organization has been detected at the external code repository server infrastructure. Then, the computing platform may send, via the communication interface, to the enterprise administrator user computing device associated with the enterprise organization, the notification comprising the information indicating that the first sensitive information associated with the enterprise organization has been detected at the external code repository server infrastructure.

In some embodiments, receiving the configuration information defining the one or more criteria for identifying the sensitive data of the enterprise organization may include receiving one or more first templates associated with exact matches of secure enterprise data and one or more second templates associated with close matches of secure enterprise data.

In some embodiments, receiving the configuration information defining the one or more criteria for identifying the sensitive data of the enterprise organization may include receiving at least one template for identifying user credentials associated with the enterprise organization. In some embodiments, receiving the configuration information defining the one or more criteria for identifying the sensitive data of the enterprise organization may include receiving at least one template for identifying passwords associated with the enterprise organization.

In some embodiments, receiving the configuration information defining the one or more criteria for identifying the sensitive data of the enterprise organization may include receiving at least one template for identifying application programming interface (API) keys associated with the enterprise organization. In some embodiments, receiving the configuration information defining the one or more criteria for identifying the sensitive data of the enterprise organization may include receiving at least one template for identifying proprietary algorithms associated with the enterprise organization or data patterns associated with the enterprise organization.

In some embodiments, monitoring the external code repository server infrastructure may include scanning incoming source code files received by the external code repository server infrastructure from one or more enterprise user computing devices.

In some embodiments, detecting that the first source code received by the external code repository server infrastructure contains the first sensitive information associated with the enterprise organization may include executing a false-positive filtering process on the first source code received by the external code repository server infrastructure. In some embodiments, detecting that the first source code received by the external code repository server infrastructure contains the first sensitive information associated with the enterprise organization may include detecting that the first source code received by the external code repository server infrastructure contains the first sensitive information associated with the enterprise organization in near real-time as the first source code is received by the external code repository server infrastructure.

In some embodiments, sending the notification comprising the information indicating that the first sensitive information associated with the enterprise organization has been detected at the external code repository server infrastructure may include sending the notification comprising the information indicating that the first sensitive information associated with the enterprise organization has been detected at the external code repository server infrastructure in near real-time as the first source code is received by the external code repository server infrastructure.

In some embodiments, the computing platform may generate a summary report comprising information associated with second sensitive information associated with the enterprise organization that has been detected at the external code repository server infrastructure. Subsequently, the computing platform may send, via the communication interface, to the enterprise administrator user computing device associated with the enterprise organization, the summary report comprising the information associated with the second sensitive information associated with the enterprise organization that has been detected at the external code repository server infrastructure.

In some embodiments, after detecting that the first source code received by the external code repository server infrastructure contains the first sensitive information associated with the enterprise organization, the computing platform may initiate an automatic deletion process on the external code repository server infrastructure to remove the first sensitive information associated with the enterprise organization from the external code repository server infrastructure.

In some embodiments, after detecting that the first source code received by the external code repository server infrastructure contains the first sensitive information associated with the enterprise organization, the computing platform may generate one or more commands directing the external code repository server infrastructure to hold the first source code for a manual review process and prevent one or more users from accessing the first source code until the manual review process is completed.

In some embodiments, after detecting that the first source code received by the external code repository server infrastructure contains the first sensitive information associated with the enterprise organization, the computing platform may identify a first enterprise user computing device as a source of the first source code. Based on identifying the first enterprise user computing device as the source of the first source code, the computing platform may generate an alert for the first enterprise user computing device indicating that the first source code received by the external code repository server infrastructure contains the first sensitive information associated with the enterprise organization. Subsequently, the computing platform may send, via the communication interface, to the first enterprise user computing device, the alert generated for the first enterprise user computing device indicating that the first source code received by the external code repository server infrastructure contains the first sensitive information associated with the enterprise organization.

In some embodiments, after detecting that the first source code received by the external code repository server infrastructure contains the first sensitive information associated with the enterprise organization, the computing platform may update the one or more criteria for identifying the sensitive data of the enterprise organization based on one or more features of the first source code received by the external code repository server infrastructure.

In some embodiments, updating the one or more criteria for identifying the sensitive data of the enterprise organization based on the one or more features of the first source code received by the external code repository server infrastructure may include updating one or more rules for detecting protected data associated with the enterprise organization. In some embodiments, updating the one or more criteria for identifying the sensitive data of the enterprise organization based on the one or more features of the first source code received by the external code repository server infrastructure may include updating one or more regular expressions for detecting protected data associated with the enterprise organization. In some embodiments, updating the one or more criteria for identifying the sensitive data of the enterprise organization based on the one or more features of the first source code received by the external code repository server infrastructure may include updating a machine learning classification model for detecting protected data associated with the enterprise organization.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
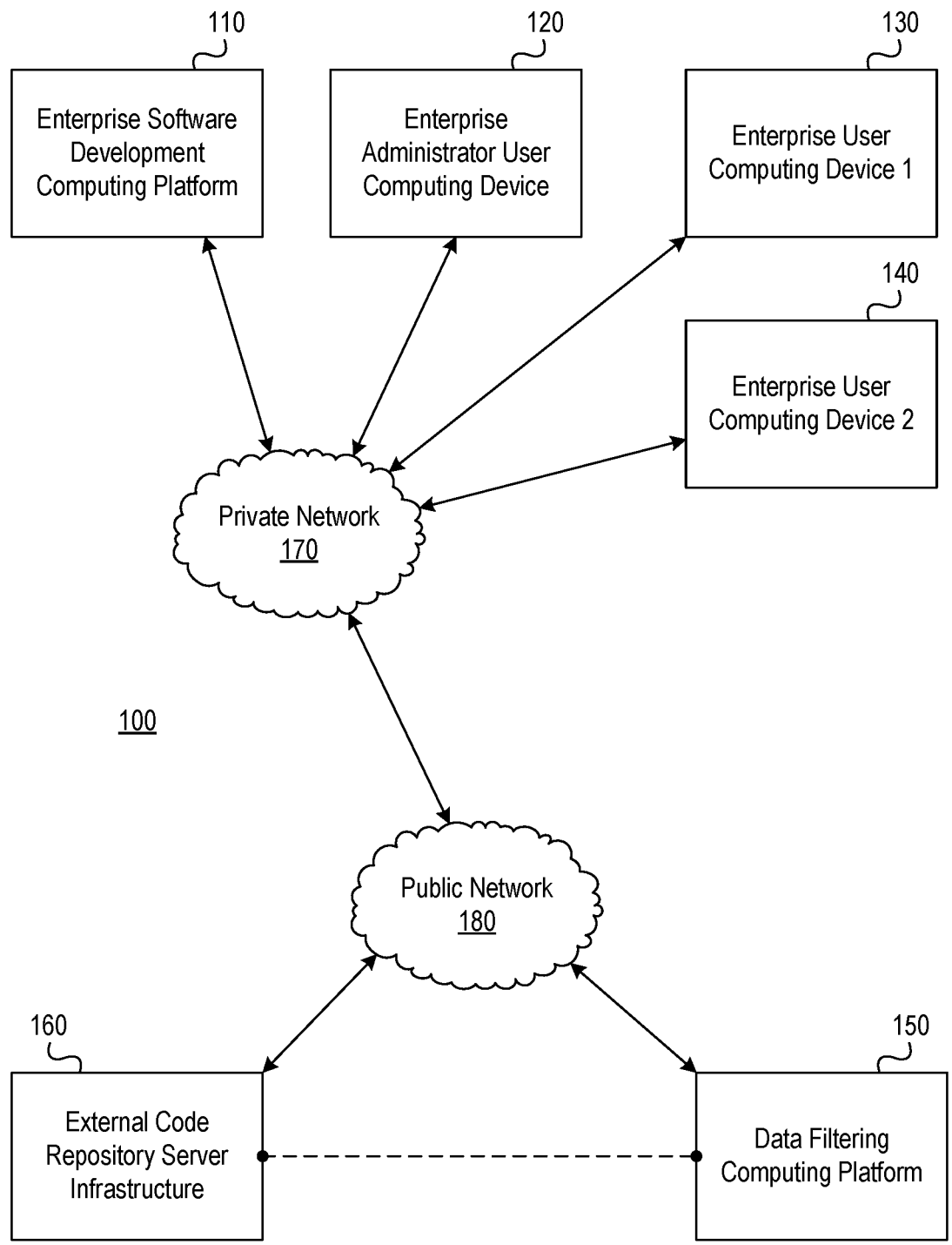
FIGS. 1A and 1B depict an illustrative computing environment for monitoring source code repository data in real-time to protect sensitive information and provide entity-specific alerts in accordance with one or more example embodiments.
Figure 1B:
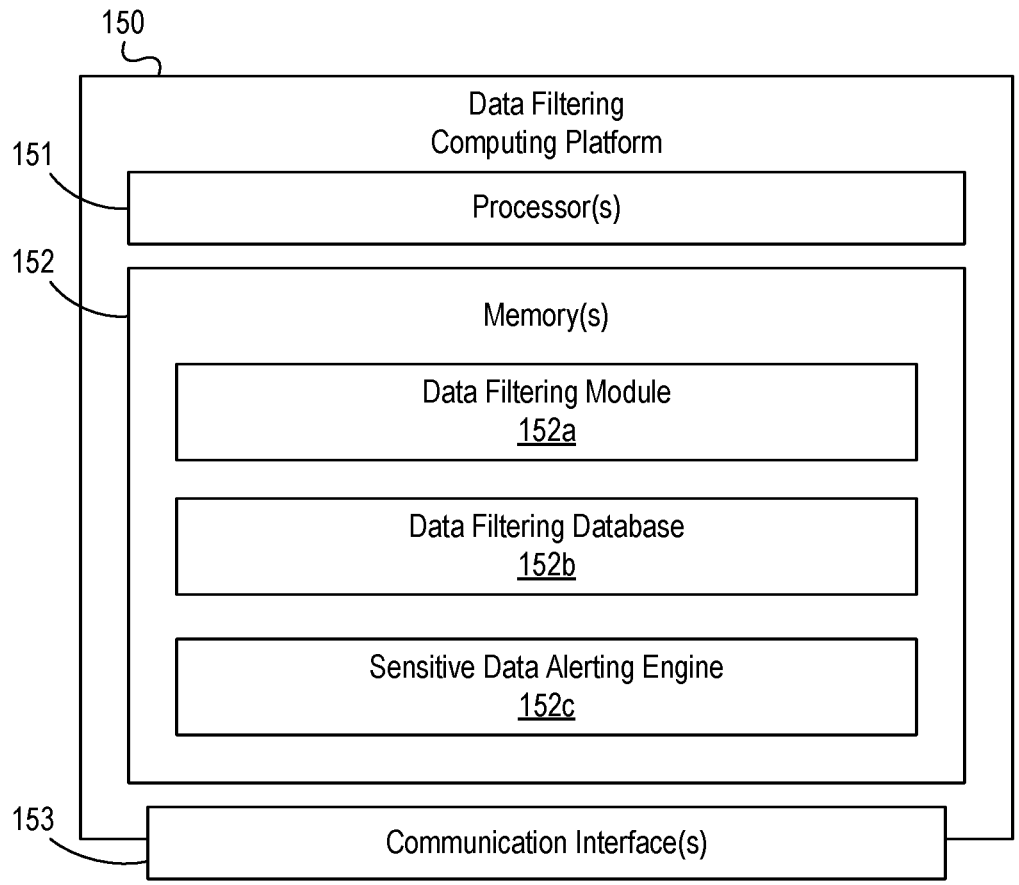

FIGS. 1A and 1B depict an illustrative computing environment for monitoring source code repository data in real-time to protect sensitive information and provide entity-specific alerts in accordance with one or more example embodiments. Referring to FIG. 1A, computing environment 100 may include one or more computer systems. For example, computing environment 100 may include an enterprise software development computing platform 110, an enterprise administrator user computing device 120, a first enterprise user computing device 130, a second enterprise user computing device 140, a data filtering computing platform 150, and external code repository server infrastructure 160.

As illustrated in greater detail below, data filtering computing platform 150 may include one or more computing devices configured to perform one or more of the functions described herein. For example, data filtering computing platform 150 may include one or more computers (e.g., laptop computers, desktop computers, servers, server blades, or the like).

Enterprise software development computing platform 110 may include one or more computing devices and/or other computer components (e.g., processors, memories, communication interfaces). In addition, enterprise software development computing platform 110 may host and/or execute one or more software development applications, provide one or more hosted software development sessions to one or more enterprise users of one or more enterprise user computing devices, compile, build, and/or test source code developed by one or more enterprise users of one or more enterprise user computing devices, and/or store source code and/or other files associated with software development processes. In one or more arrangements, enterprise software development computing platform 110 may be associated with an enterprise organization, such as a financial institution, and enterprise software development computing platform 110 may be connected to other servers and/or enterprise computing infrastructure that is configured to provide various enterprise and/or back-office computing functions for the enterprise organization. For example, this enterprise computing infrastructure may include various servers and/or databases that store and/or otherwise maintain account information, such as financial account information including account balances, transaction history, account owner information, and/or other information. In addition, this enterprise computing infrastructure may process and/or otherwise execute transactions on specific accounts based on commands and/or other information received from other computer systems included in computing environment 100.

Enterprise administrator user computing device 120 may be a personal computing device (e.g., desktop computer, laptop computer) or mobile computing device (e.g., smartphone, tablet). In addition, enterprise administrator user computing device 120 may be linked to and/or used by an administrative user (who may, e.g., be an information technology systems administrator of an enterprise organization operating enterprise software development computing platform 110). For instance, enterprise administrator user computing device 120 may be linked to and/or used by an administrative user who may use enterprise administrator user computing device 120 to define one or more policies and/or rules for enterprise devices in an operating environment (which may, e.g., include policies and/or rules governing the uploading of source code to one or more external source code repositories). For example, enterprise administrator user computing device 120 may be used by an administrative user to define one or more criteria for identifying sensitive data that should not be posted to an external source code repository.

Enterprise user computing device 130 may be a personal computing device (e.g., desktop computer, laptop computer) or mobile computing device (e.g., smartphone, tablet). In addition, enterprise user computing device 130 may be linked to and/or used by a specific enterprise user (who may, e.g., be an employee or other affiliate of an enterprise organization operating enterprise software development computing platform 110). For instance, enterprise user computing device 130 may be linked to and/or used by a first enterprise user in writing source code, developing software applications, and/or performing other functions. Enterprise user computing device 140 also may be a personal computing device (e.g., desktop computer, laptop computer) or mobile computing device (e.g., smartphone, tablet). In addition, enterprise user computing device 140 may be linked to and/or used by a specific enterprise user (who may, e.g., be an employee or other affiliate of an enterprise organization operating enterprise software development computing platform 110, and who may be different from the user of enterprise user computing device 130). For instance, enterprise user computing device 140 may be linked to and/or used by a second enterprise user in writing source code, developing software applications, and/or performing other functions.

External code repository server infrastructure 160 may include one or more computing devices and/or other computer components (e.g., processors, memories, communication interfaces). In addition, external code repository server infrastructure 160 may be operated by and/or associated with a third-party entity (which may, e.g., be different from an enterprise organization that operates enterprise software development computing platform 110). For example, external code repository server infrastructure 160 may host and/or otherwise provide a source code repository that allows public access and/or private access to one or more source code files uploaded by various software developers, including software developers associated with an enterprise organization that operates enterprise software development computing platform 110 and/or other software developers that are not associated with an enterprise organization that operates enterprise software development computing platform 110. In some instances, external code repository server infrastructure 160 may provide source code storage functions, source code retention functions, source code searching functions, and/or other functions (e.g., to software developers associated with an enterprise organization that operates enterprise software development computing platform 110 and/or to other software developers that are not associated with an enterprise organization that operates enterprise software development computing platform 110). In addition, external code repository server infrastructure 160 may be located outside of an enterprise firewall associated with enterprise software development computing platform 110 and may communicate with one or more enterprise devices (e.g., enterprise administrator user computing device 120, enterprise user computing device 130, enterprise user computing device 140) via the enterprise firewall.

Computing environment 100 also may include one or more networks, which may interconnect one or more of enterprise software development computing platform 110, enterprise administrator user computing device 120, enterprise user computing device 130, enterprise user computing device 140, data filtering computing platform 150, and external code repository server infrastructure 160. For example, computing environment 100 may include a private network 170 (which may, e.g., interconnect enterprise software development computing platform 110, enterprise administrator user computing device 120, enterprise user computing device 130, enterprise user computing device 140, and/or one or more other systems which may be associated with an enterprise organization, such as a financial institution) and public network 180 (which may, e.g., interconnect data filtering computing platform 150 and external code repository server infrastructure 160 with private network 170 and/or one or more other systems, public networks, sub-networks, and/or the like).

In one or more arrangements, enterprise software development computing platform 110, enterprise administrator user computing device 120, enterprise user computing device 130, enterprise user computing device 140, external code repository server infrastructure 160, and/or the other systems included in computing environment 100 may be or include any type of computing device capable of receiving a user interface, receiving input via the user interface, and communicating the received input to one or more other computing devices. For example, enterprise software development computing platform 110, enterprise administrator user computing device 120, enterprise user computing device 130, enterprise user computing device 140, external code repository server infrastructure 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of enterprise software development computing platform 110, enterprise administrator user computing device 120, enterprise user computing device 130, enterprise user computing device 140, data filtering computing platform 150, and external code repository server infrastructure 160 may, in some instances, be special-purpose computing devices configured to perform specific functions.

Referring to FIG. 1B, data filtering computing platform 150 may include one or more processors 151, memory 152, and communication interface 153. A data bus may interconnect processor 151, memory 152, and communication interface 153. Communication interface 153 may be a network interface configured to support communication between data filtering computing platform 150 and one or more networks (e.g., network 170, network 180, or the like). Memory 152 may include one or more program modules having instructions that when executed by processor 151 cause data filtering computing platform 150 to perform one or more functions described herein and/or one or more databases that may store and/or otherwise maintain information which may be used by such program modules and/or processor 151. In some instances, the one or more program modules and/or databases may be stored by and/or maintained in different memory units of data filtering computing platform 150 and/or by different computing devices that may form and/or otherwise make up data filtering computing platform 150. For example, memory 152 may have, store, and/or include a data filtering module 152a, a data filtering database 152b, and a sensitive data alerting engine 152c. Data filtering module 152a may have instructions that direct and/or cause data filtering computing platform 150 to monitor source code repository data in real-time to protect sensitive information and provide entity-specific alerts. Data filtering database 152b may store information used by data filtering module 152a and/or data filtering computing platform 150 in monitoring source code repository data in real-time to protect sensitive information and provide entity-specific alerts. Sensitive data alerting engine 152c may generate, send, and/or otherwise provide alerts to various systems and/or devices, such as when data filtering computing platform 150 detects the presence of sensitive information at a source code repository being monitored by data filtering computing platform 150.

Figure 2:
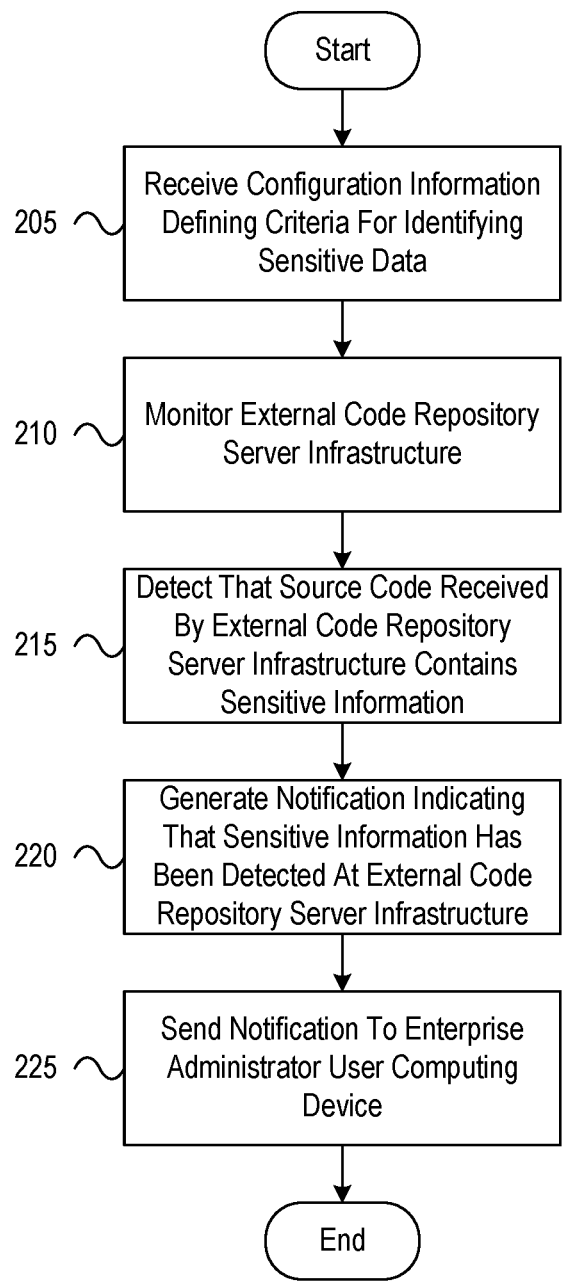
FIG. 2 depicts an illustrative method for monitoring source code repository data in real-time to protect sensitive information and provide entity-specific alerts in accordance with one or more example embodiments.

FIG. 2 depicts an illustrative method for monitoring source code repository data in real-time to protect sensitive information and provide entity-specific alerts in accordance with one or more example embodiments. Referring to FIG. 2, at step 205, a computing platform (e.g., data filtering computing platform 150) having at least one processor, a communication interface, and memory may receive, via the communication interface, from an enterprise administrator user computing device (e.g., enterprise administrator user computing device 120) associated with an enterprise organization, configuration information defining one or more criteria for identifying sensitive data of the enterprise organization. At step 210, the computing platform (e.g., data filtering computing platform 150) may monitor external code repository server infrastructure (e.g., external code repository server infrastructure 160) based on the configuration information defining the one or more criteria for identifying the sensitive data of the enterprise organization. At step 215, based on monitoring the external code repository server infrastructure (e.g., external code repository server infrastructure 160), the computing platform (e.g., data filtering computing platform 150) may detect that first source code received by the external code repository server infrastructure (e.g., external code repository server infrastructure 160) contains first sensitive information associated with the enterprise organization.

At step 220, in response to detecting that the first source code received by the external code repository server infrastructure (e.g., external code repository server infrastructure 160) contains the first sensitive information associated with the enterprise organization, the computing platform (e.g., data filtering computing platform 150) may generate a notification comprising information indicating that the first sensitive information associated with the enterprise organization has been detected at the external code repository server infrastructure (e.g., external code repository server infrastructure 160). At step 225, the computing platform (e.g., data filtering computing platform 150) may send, via the communication interface, to the enterprise administrator user computing device (e.g., enterprise administrator user computing device 120) associated with the enterprise organization, the notification comprising the information indicating that the first sensitive information associated with the enterprise organization has been detected at the external code repository server infrastructure (e.g., external code repository server infrastructure 160).

Figure 3A:
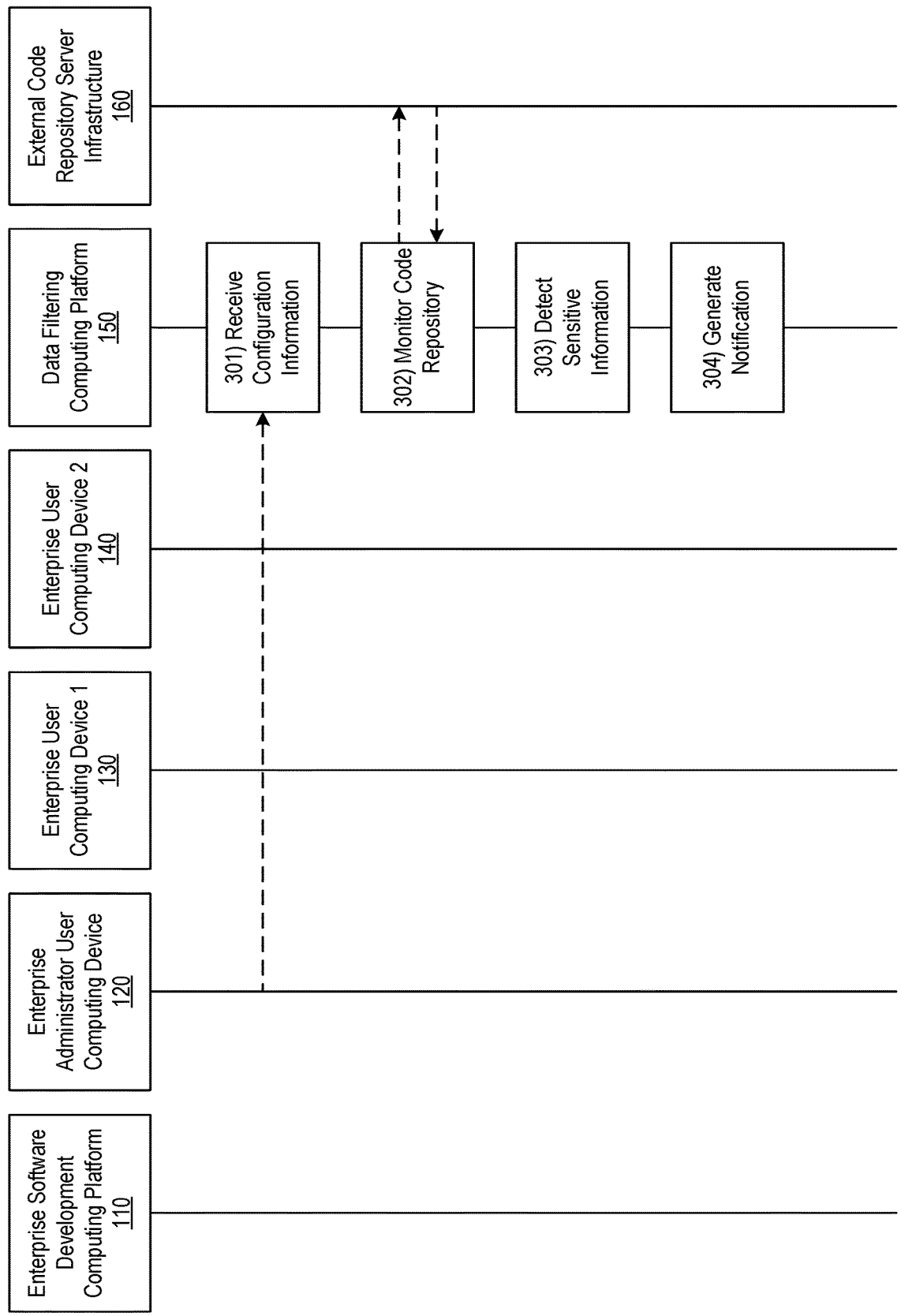
FIGS. 3A-3D depict an illustrative event sequence for monitoring source code repository data in real-time to protect sensitive information and provide entity-specific alerts in accordance with one or more example embodiments.

FIGS. 3A-3D depict an illustrative event sequence for monitoring source code repository data in real-time to protect sensitive information and provide entity-specific alerts in accordance with one or more example embodiments. Referring to FIG. 3A, at step 301, data filtering computing platform 150 may receive configuration information from enterprise administrator user computing device 120. For example, at step 301, data filtering computing platform 150 may receive, via the communication interface (e.g., communication interface 153), from an enterprise administrator user computing device (e.g., enterprise administrator user computing device 120) associated with an enterprise organization, configuration information defining one or more criteria for identifying sensitive data of the enterprise organization. Such criteria may, for instance, define contents and/or other features that are always and/or often associated with sensitive data of the enterprise organization, which may include confidential data, proprietary data, and/or other data that is intended to be kept within the enterprise organization and/or otherwise be maintained privately to the enterprise organization.

In some embodiments, receiving the configuration information defining the one or more criteria for identifying the sensitive data of the enterprise organization may include receiving one or more first templates associated with exact matches of secure enterprise data and one or more second templates associated with close matches of secure enterprise data. For example, in receiving the configuration information defining the one or more criteria for identifying the sensitive data of the enterprise organization at step 301, data filtering computing platform 150 may receive one or more first templates associated with exact matches of secure enterprise data and one or more second templates associated with close matches of secure enterprise data. For instance, the templates may be generated by and/or created on enterprise administrator user computing device 120 (e.g., by an administrator user of enterprise administrator user computing device 120) and may define contents and/or other features associated with exact matches of secure enterprise data and/or close matches of secure enterprise data. For example, one template may include information indicating that exact matches of secure enterprise data include a unique enterprise identifier string having a specific format that is recognizable by a regular expression (e.g., "^enterprise-x").

In some embodiments, receiving the configuration information defining the one or more criteria for identifying the sensitive data of the enterprise organization may include receiving at least one template for identifying user credentials associated with the enterprise organization. For example, in receiving the configuration information defining the one or more criteria for identifying the sensitive data of the enterprise organization at step 301, data filtering computing platform 150 may receive at least one template for identifying user credentials associated with the enterprise organization. For instance, the at least one template for identifying user credentials associated with the enterprise organization may be generated by and/or created on enterprise administrator user computing device 120 (e.g., by an administrator user of enterprise administrator user computing device 120) and may define contents and/or other features associated with user credentials associated with the enterprise organization. For example, one template may include information indicating a username format that is recognizable by a regular expression (e.g., "^enterprise-x-user").

In some embodiments, receiving the configuration information defining the one or more criteria for identifying the sensitive data of the enterprise organization may include receiving at least one template for identifying passwords associated with the enterprise organization. For example, in receiving the configuration information defining the one or more criteria for identifying the sensitive data of the enterprise organization at step 301, data filtering computing platform 150 may receive at least one template for identifying passwords associated with the enterprise organization. For instance, the at least one template for identifying passwords associated with the enterprise organization may be generated by and/or created on enterprise administrator user computing device 120 (e.g., by an administrator user of enterprise administrator user computing device 120) and may define contents and/or other features associated with passwords associated with the enterprise organization. For example, one template may include information indicating a password format that is recognizable by a regular expression (e.g., ".ent$").

In some embodiments, receiving the configuration information defining the one or more criteria for identifying the sensitive data of the enterprise organization may include receiving at least one template for identifying application programming interface (API) keys associated with the enterprise organization. For example, in receiving the configuration information defining the one or more criteria for identifying the sensitive data of the enterprise organization at step 301, data filtering computing platform 150 may receive at least one template for identifying application programming interface (API) keys associated with the enterprise organization. For instance, the at least one template for identifying application programming interface (API) keys associated with the enterprise organization may be generated by and/or created on enterprise administrator user computing device 120 (e.g., by an administrator user of enterprise administrator user computing device 120) and may define contents and/or other features associated with API keys associated with the enterprise organization. For example, one template may include information indicating an enterprise-specific API key format that is recognizable by a regular expression (e.g., ".ent-key$").

In some embodiments, receiving the configuration information defining the one or more criteria for identifying the sensitive data of the enterprise organization may include receiving at least one template for identifying proprietary algorithms associated with the enterprise organization or data patterns associated with the enterprise organization. For example, in receiving the configuration information defining the one or more criteria for identifying the sensitive data of the enterprise organization at step 301, data filtering computing platform 150 may receive at least one template for identifying proprietary algorithms associated with the enterprise organization or data patterns associated with the enterprise organization. For instance, the at least one template for identifying proprietary algorithms associated with the enterprise organization or data patterns associated with the enterprise organization may be generated by and/or created on enterprise administrator user computing device 120 (e.g., by an administrator user of enterprise administrator user computing device 120) and may define contents and/or other features associated with proprietary algorithms or data patterns associated with the enterprise organization. For example, one template may include information indicating an enterprise-specific algorithm format that is recognizable by a regular expression (e.g., "^.ent-alg"). Another template may include information indicating an enterprise-specific data pattern format that is recognizable by a regular expression (e.g., ".ent-data$").

At step 302, data filtering computing platform 150 may monitor external code repository server infrastructure 160. For example, at step 302, data filtering computing platform 150 may monitor external code repository server infrastructure (e.g., external code repository server infrastructure 160) based on the configuration information defining the one or more criteria for identifying the sensitive data of the enterprise organization. In some embodiments, monitoring the external code repository server infrastructure may include scanning incoming source code files received by the external code repository server infrastructure from one or more enterprise user computing devices. For example, in monitoring the external code repository server infrastructure (e.g., external code repository server infrastructure 160) at step 302, data filtering computing platform 150 may scan incoming source code files received by the external code repository server infrastructure (e.g., external code repository server infrastructure 160) from one or more enterprise user computing devices (e.g., enterprise user computing device 130, enterprise user computing device 140). For instance, data filtering computing platform 150 may scan source code files received by external code repository server infrastructure 160 from various other devices (e.g., enterprise user computing device 130, enterprise user computing device 140) to identify, in the source code contained within such source code files, contents and/or other features that are associated with sensitive data of the enterprise organization (e.g., based on the templates and/or other configuration received at step 301 defining such contents and/or other features).

At step 303, data filtering computing platform 150 may detect that a specific source code file contains sensitive information. For example, at step 303, based on monitoring the external code repository server infrastructure (e.g., external code repository server infrastructure 160), data filtering computing platform 150 may detect that first source code received by the external code repository server infrastructure (e.g., external code repository server infrastructure 160) contains first sensitive information associated with the enterprise organization.

In some embodiments, detecting that the first source code received by the external code repository server infrastructure contains the first sensitive information associated with the enterprise organization may include executing a false-positive filtering process on the first source code received by the external code repository server infrastructure. For example, in detecting that the first source code received by the external code repository server infrastructure (e.g., external code repository server infrastructure 160) contains the first sensitive information associated with the enterprise organization at step 303, data filtering computing platform 150 may execute a false-positive filtering process on the first source code received by the external code repository server infrastructure (e.g., external code repository server infrastructure 160). For instance, in executing the false-positive filtering process on the first source code received by the external code repository server infrastructure (e.g., external code repository server infrastructure 160), data filtering computing platform 150 may distinguish and filter out source code contents that may have been initially flagged as containing sensitive information but, upon additional analysis by the false-positive filtering process, are determined to not contain sensitive information.

In some embodiments, detecting that the first source code received by the external code repository server infrastructure contains the first sensitive information associated with the enterprise organization may include detecting that the first source code received by the external code repository server infrastructure contains the first sensitive information associated with the enterprise organization in near real-time as the first source code is received by the external code repository server infrastructure. For example, in detecting that the first source code received by the external code repository server infrastructure (e.g., external code repository server infrastructure 160) contains the first sensitive information associated with the enterprise organization at step 303, data filtering computing platform 150 may detect that the first source code received by the external code repository server infrastructure (e.g., external code repository server infrastructure 160) contains the first sensitive information associated with the enterprise organization in near real-time as the first source code is received by the external code repository server infrastructure (external code repository server infrastructure 160). For instance, data filtering computing platform 150 may scan incoming source code files received by the external code repository server infrastructure (e.g., external code repository server infrastructure 160) from one or more enterprise user computing devices (e.g., enterprise user computing device 130, enterprise user computing device 140) in real-time (e.g., contemporaneously as such source code files are received by external code repository server infrastructure 160) and may contemporaneously identify whether such source code files contain sensitive information.

At step 304, data filtering computing platform 150 may generate a notification. For example, at step 304, in response to detecting that the first source code received by the external code repository server infrastructure (e.g., external code repository server infrastructure 160) contains the first sensitive information associated with the enterprise organization, data filtering computing platform 150 may generate a notification comprising information indicating that the first sensitive information associated with the enterprise organization has been detected at the external code repository server infrastructure (e.g., external code repository server infrastructure 160). For instance, data filtering computing platform 150 may generate such a notification at step 304 by populating one or more notification templates with data specific to the sensitive information that has been detected.

Figure 3B:
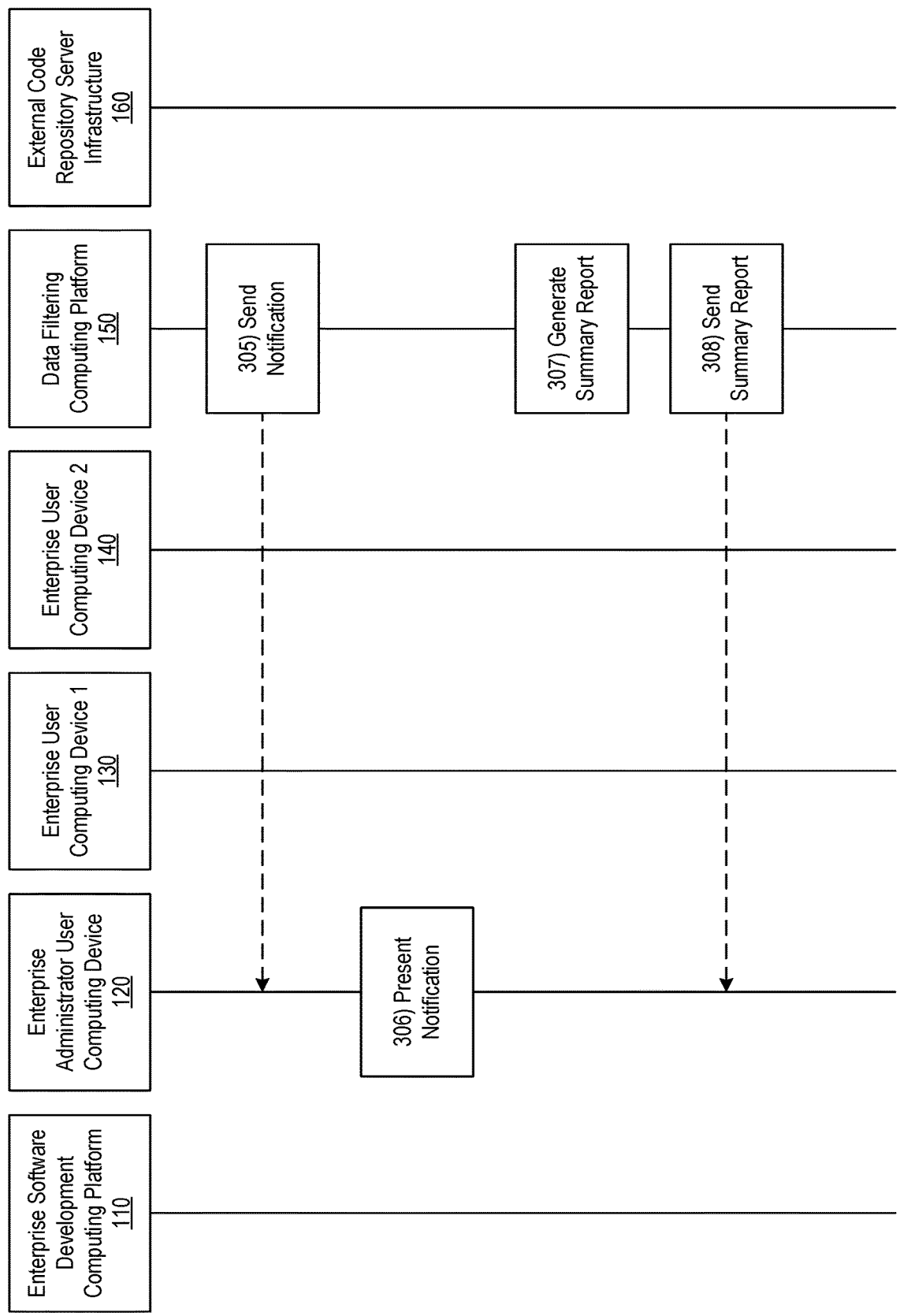

Referring to FIG. 3B, at step 305, data filtering computing platform 150 may send the notification to enterprise administrator user computing device 120. For example, at step 305, data filtering computing platform 150 may send, via the communication interface (e.g., communication interface 153), to the enterprise administrator user computing device (e.g., enterprise administrator user computing device 120) associated with the enterprise organization, the notification comprising the information indicating that the first sensitive information associated with the enterprise organization has been detected at the external code repository server infrastructure (e.g., external code repository server infrastructure 160).

In some embodiments, sending the notification comprising the information indicating that the first sensitive information associated with the enterprise organization has been detected at the external code repository server infrastructure may include sending the notification comprising the information indicating that the first sensitive information associated with the enterprise organization has been detected at the external code repository server infrastructure in near real-time as the first source code is received by the external code repository server infrastructure. For example, in sending the notification comprising the information indicating that the first sensitive information associated with the enterprise organization has been detected at the external code repository server infrastructure (e.g., external code repository server infrastructure 160) at step 305, data filtering computing platform 150 may send the notification comprising the information indicating that the first sensitive information associated with the enterprise organization has been detected at the external code repository server infrastructure (e.g., external code repository server infrastructure 160) in near real-time as the first source code is received by the external code repository server infrastructure (e.g., external code repository server infrastructure 160). For instance, data filtering computing platform 150 may scan incoming source code files received by the external code repository server infrastructure (e.g., external code repository server infrastructure 160) from one or more enterprise user computing devices (e.g., enterprise user computing device 130, enterprise user computing device 140) in real-time (e.g., contemporaneously as such source code files are received by external code repository server infrastructure 160) and may contemporaneously generate and send one or more notifications when sensitive information is detected.

Figure 4:
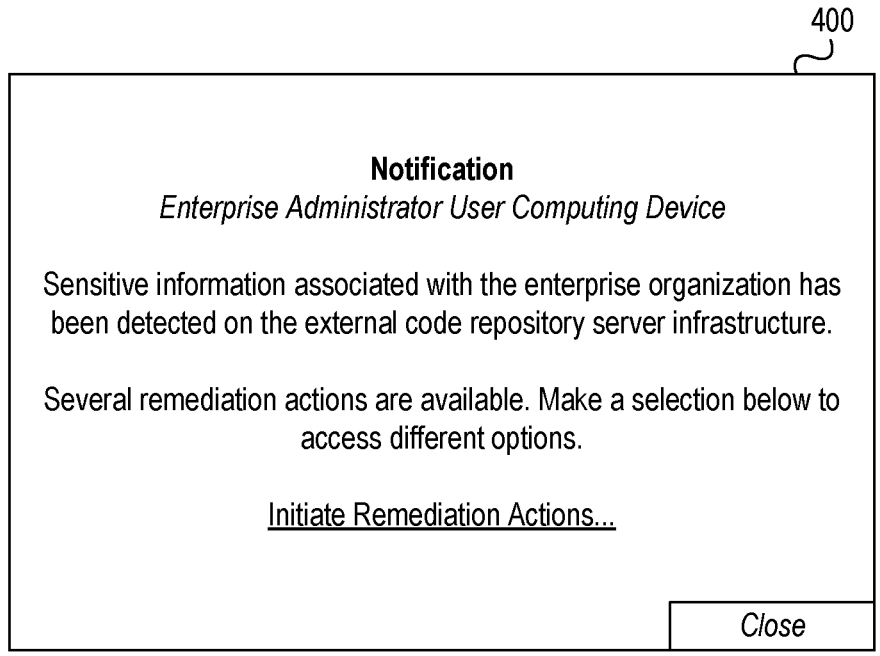
FIGS. 4 and 5 depict illustrative graphical user interfaces for monitoring source code repository data in real-time to protect sensitive information and provide entity-specific alerts in accordance with one or more example embodiments.

At step 306, enterprise administrator user computing device 120 may present the notification. For example, at step 306, enterprise administrator user computing device 120 may present the notification received from data filtering computing platform 150. In some instances, in presenting such a notification, enterprise administrator user computing device 120 may display and/or otherwise present a graphical user interface similar to graphical user interface 400, which is illustrated in FIG. 4. As seen in FIG. 4, graphical user interface 400 may include text and/or other content indicating that sensitive information has been detected and/or that remediation actions are available (e.g., "Sensitive information associated with the enterprise organization has been detected on the external code repository server infrastructure. Several remediation actions are available. Make a selection below to access different options. Initiate Remediation Actions . . . "). Subsequently, data filtering computing platform 150 may receive, from enterprise administrator user computing device 120, information corresponding to one or more selections made by the user of enterprise administrator user computing device 120 (which may, e.g., cause data filtering computing platform 150 to execute one or more remediation actions).

At step 307, data filtering computing platform 150 may generate a summary report. For example, at step 307, data filtering computing platform 150 may generate a summary report comprising information associated with second sensitive information associated with the enterprise organization that has been detected at the external code repository server infrastructure (e.g., external code repository server infrastructure 160). For instance, such a summary report (which may, e.g., be generated by data filtering computing platform 150 at step 307) may include information identifying the first sensitive information associated with the enterprise organization has been detected at the external code repository server infrastructure (e.g., external code repository server infrastructure 160) and/or additional sensitive information associated with the enterprise organization that has been detected by data filtering computing platform 150 at external code repository server infrastructure 160. Such additional sensitive information may, for instance, be included in additional source code that was uploaded to external code repository server infrastructure 160 and analyzed by data filtering computing platform 150.

At step 308, data filtering computing platform 150 may send the summary report to enterprise administrator user computing device 120. For example, at step 308, data filtering computing platform 150 may send, via the communication interface (e.g., communication interface 153), to the enterprise administrator user computing device (e.g., enterprise administrator user computing device 120) associated with the enterprise organization, the summary report comprising the information associated with the second sensitive information associated with the enterprise organization that has been detected at the external code repository server infrastructure (e.g., external code repository server infrastructure 160). By sending the summary report to enterprise administrator user computing device 120, data filtering computing platform 150 may cause enterprise administrator user computing device 120 to display and/or otherwise present one or more graphical user interfaces that include content selected from and/or otherwise associated with the summary report generated by data filtering computing platform 150.

Figure 3C:
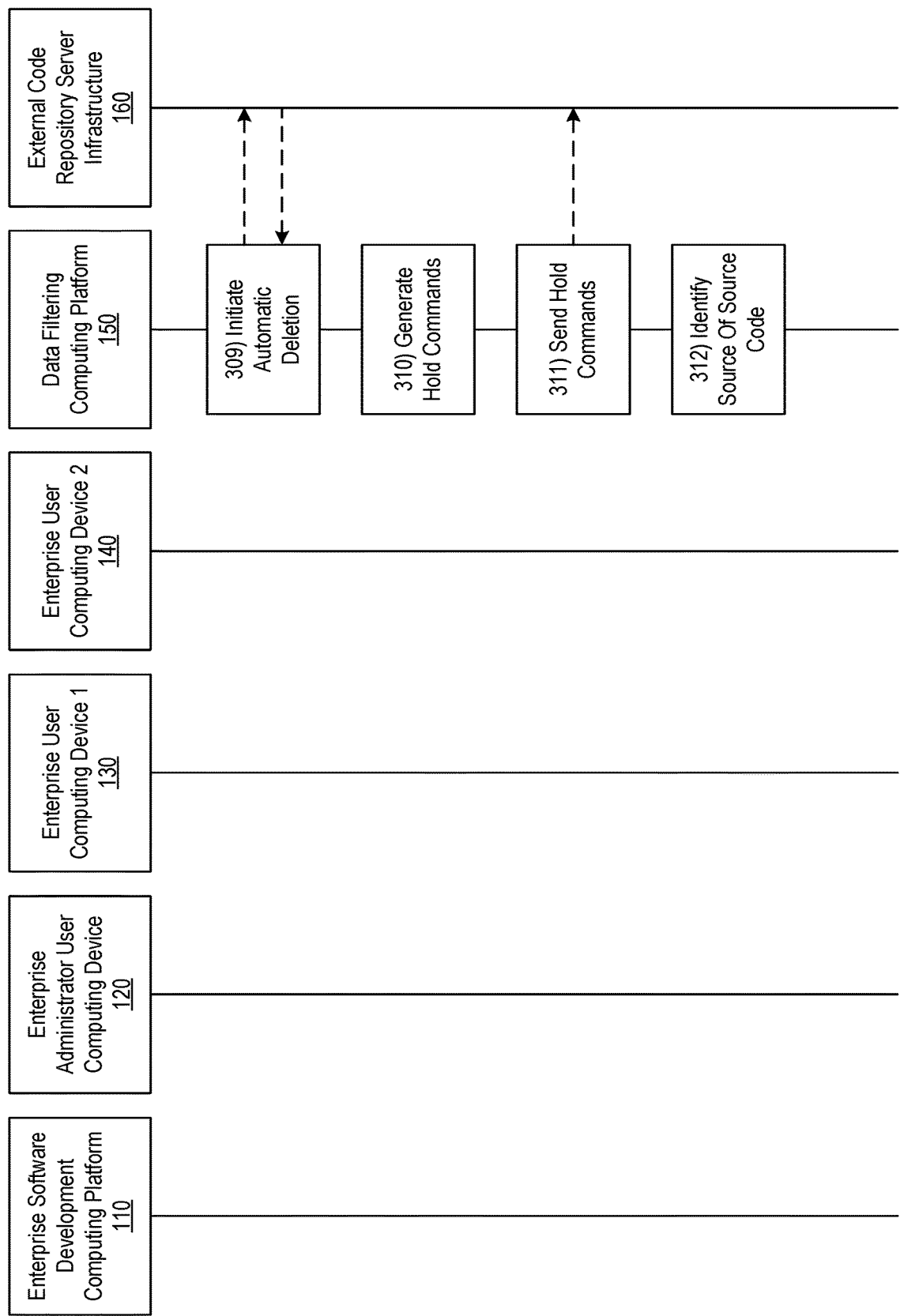

Referring to FIG. 3C, at step 309, data filtering computing platform 150 may initiate automatic deletion (e.g., of the sensitive content detected on external code repository server infrastructure 160). For example, at step 309, after detecting that the first source code received by the external code repository server infrastructure (e.g., external code repository server infrastructure 160) contains the first sensitive information associated with the enterprise organization, data filtering computing platform 150 may initiate an automatic deletion process on the external code repository server infrastructure (e.g., external code repository server infrastructure 160) to remove the first sensitive information associated with the enterprise organization from the external code repository server infrastructure (e.g., external code repository server infrastructure 160). For instance, data filtering computing platform 150 may trigger and/or otherwise cause external code repository server infrastructure 160 to delete source code identified by data filtering computing platform 150 as having sensitive content (e.g., by generating and/or sending one or more automatic deletion commands to external code repository server infrastructure 160). In some instances, data filtering computing platform 150 may cause external code repository server infrastructure 160 to delete entire source code files identified as containing sensitive content, while in other instances, data filtering computing platform 150 may cause external code repository server infrastructure 160 to delete sensitive content itself from identified source code files while preserving and/or otherwise not deleting the surrounding source code and/or the associated source code files.

At step 310, data filtering computing platform 150 may generate one or more hold commands. For example, at step 310, after detecting that the first source code received by the external code repository server infrastructure (e.g., external code repository server infrastructure 160) contains the first sensitive information associated with the enterprise organization, data filtering computing platform 150 may generate one or more commands directing the external code repository server infrastructure (e.g., external code repository server infrastructure 160) to hold the first source code for a manual review process and prevent one or more users from accessing the first source code until the manual review process is completed.

At step 311, data filtering computing platform 150 may send the one or more hold commands to external code repository server infrastructure 160. For instance, by generating and sending such commands, data filtering computing platform 150 may allow and/or cause the first source code to be manually reviewed (and potentially deleted and/or otherwise edited to remove the sensitive information, e.g., by an administrator user of enterprise administrator user computing device 120 during a manual review process) before the first source code is published and/or otherwise made publicly available to other users of external code repository server infrastructure 160.

At step 312, data filtering computing platform 150 may identify a source of the first source code. For example, at step 312, after detecting that the first source code received by the external code repository server infrastructure (e.g., external code repository server infrastructure 160) contains the first sensitive information associated with the enterprise organization, data filtering computing platform 150 may identify a first enterprise user computing device (e.g., enterprise user computing device 130) as a source of the first source code. For instance, data filtering computing platform 150 may determine and/or otherwise identify that enterprise user computing device 130 and/or the user of enterprise user computing device 130 created and/or originated the first source code and/or uploaded the first source code to external code repository server infrastructure 160. Data filtering computing platform 150 may, for instance, determine and/or otherwise identify that enterprise user computing device 130 and/or the user of enterprise user computing device 130 created and/or originated the first source code based on scanning header information associated with the source code and/or metadata associated with the source code files.

Figure 3D:
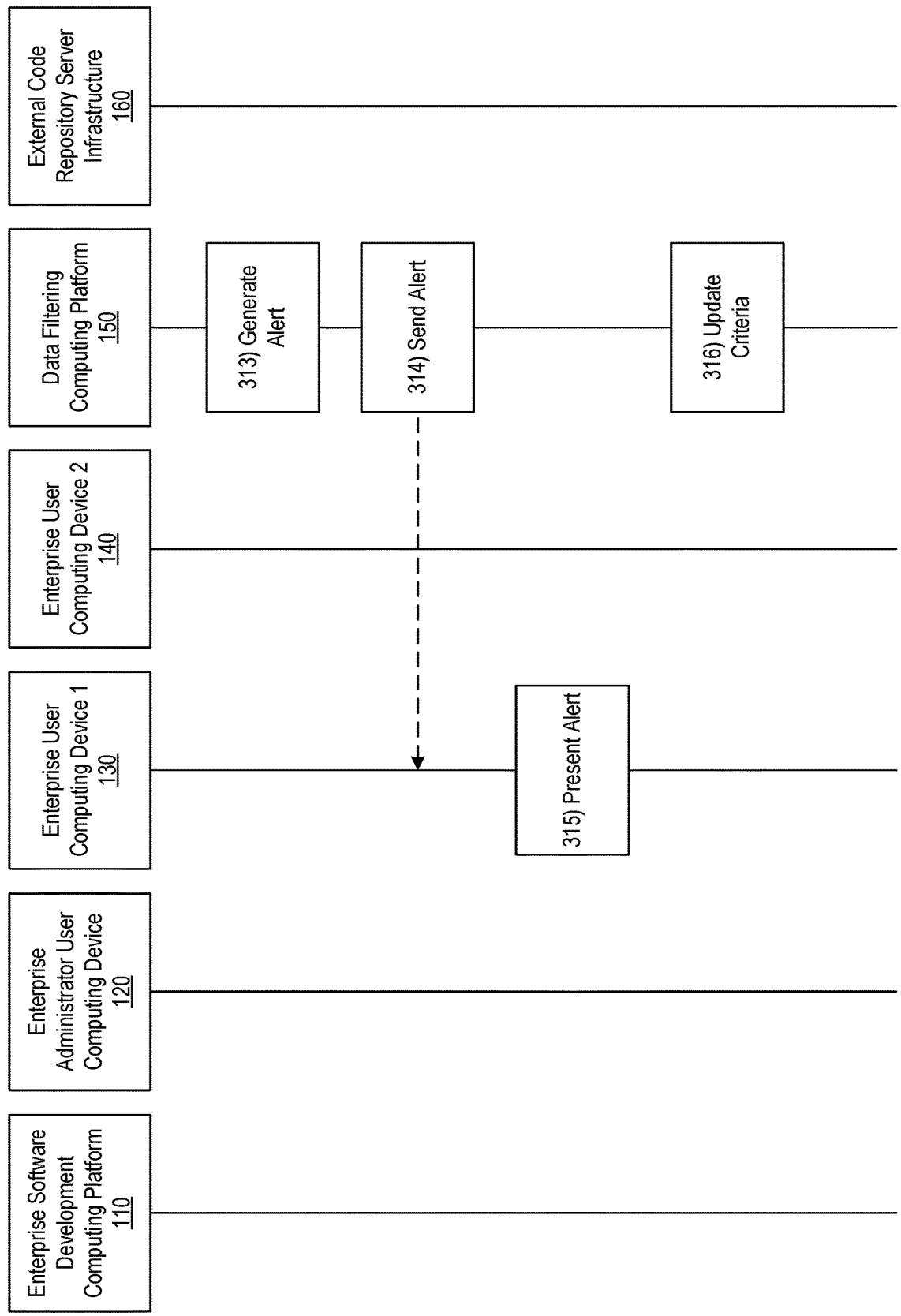

Referring to FIG. 3D, at step 313, data filtering computing platform 150 may generate an alert. For example, at step 313, based on identifying the first enterprise user computing device (e.g., enterprise user computing device 130) as the source of the first source code, data filtering computing platform 150 may generate an alert for the first enterprise user computing device (e.g., enterprise user computing device 130) indicating that the first source code received by the external code repository server infrastructure (e.g., external code repository server infrastructure 160) contains the first sensitive information associated with the enterprise organization.

At step 314, data filtering computing platform 150 may send the alert to enterprise user computing device 130. For example, at step 314, data filtering computing platform 150 may send, via the communication interface (e.g., communication interface 153), to the first enterprise user computing device (e.g., enterprise user computing device 130), the alert generated for the first enterprise user computing device (e.g., enterprise user computing device 130) indicating that the first source code received by the external code repository server infrastructure (e.g., external code repository server infrastructure 160) contains the first sensitive information associated with the enterprise organization.

Figure 5:
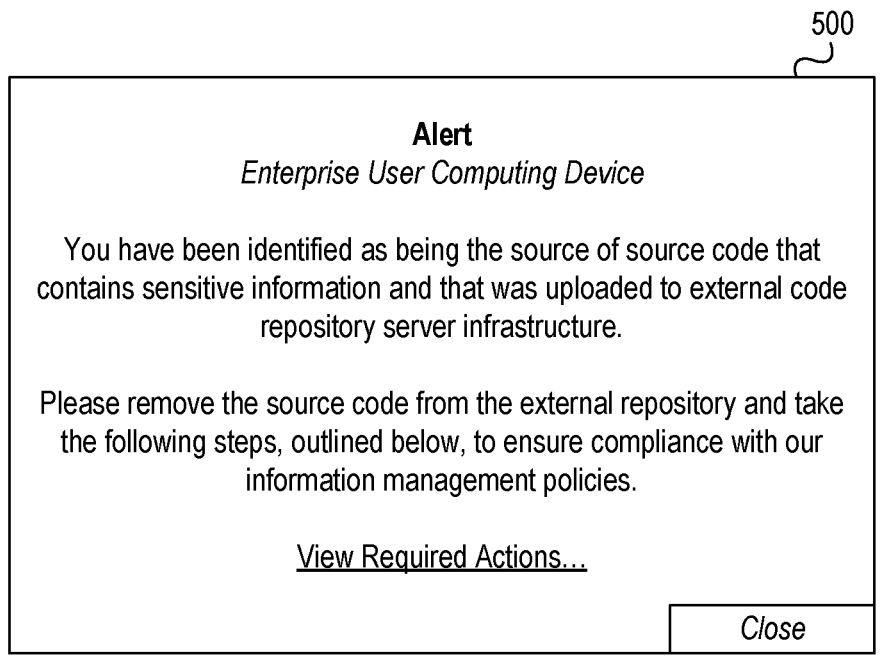

At step 315, enterprise user computing device 130 may present the alert received from data filtering computing platform 150. In some instances, in presenting such an alert, enterprise user computing device 130 may display and/or otherwise present a graphical user interface similar to graphical user interface 500, which is illustrated in FIG. 5. As seen in FIG. 5, graphical user interface 500 may include text and/or other content indicating that sensitive information has been detected and/or that remediation actions are suggested and/or required by the user of enterprise user computing device 130 (e.g., "You have been identified as being the source of source code that contains sensitive information and that was uploaded to external code repository server infrastructure. Please remove the source code from the external repository and take the following steps, outlined below, to ensure compliance with our information management policies. View Required Actions . . . "). Subsequently, data filtering computing platform 150 may receive, from enterprise user computing device 130, information corresponding to one or more selections made by the user of enterprise user computing device 130 (which may, e.g., cause data filtering computing platform 150 to execute one or more remediation actions on external code repository server infrastructure 160 and/or the source code stored on external code repository server infrastructure 160).

At step 316, data filtering computing platform 150 may update one or more criteria maintained and/or used by data filtering computing platform 150 in identifying sensitive information (e.g., based on the content included in the first source code, the nature of the first source code, and/or other features associated with the first source code). For example, at step 316, after detecting that the first source code received by the external code repository server infrastructure (e.g., external code repository server infrastructure 160) contains the first sensitive information associated with the enterprise organization, data filtering computing platform 150 may update the one or more criteria for identifying the sensitive data of the enterprise organization based on one or more features of the first source code received by the external code repository server infrastructure (e.g., external code repository server infrastructure 160).

In some embodiments, updating the one or more criteria for identifying the sensitive data of the enterprise organization based on the one or more features of the first source code received by the external code repository server infrastructure may include updating one or more rules for detecting protected data associated with the enterprise organization. For example, in updating the one or more criteria for identifying the sensitive data of the enterprise organization based on the one or more features of the first source code received by the external code repository server infrastructure (e.g., external code repository server infrastructure 160) at step 316, data filtering computing platform 150 may update one or more rules for detecting protected data associated with the enterprise organization. For instance, such rules may define certain file types that should and/or should not be analyzed by data filtering computing platform 150 in monitoring external code repository server infrastructure 160, certain remediation actions that should and/or should not be taken by data filtering computing platform 150 when various different types of sensitive information are detected on external code repository server infrastructure 160, and/or other rules.

In some embodiments, updating the one or more criteria for identifying the sensitive data of the enterprise organization based on the one or more features of the first source code received by the external code repository server infrastructure may include updating one or more regular expressions for detecting protected data associated with the enterprise organization. For example, in updating the one or more criteria for identifying the sensitive data of the enterprise organization based on the one or more features of the first source code received by the external code repository server infrastructure (e.g., external code repository server infrastructure 160) at step 316, data filtering computing platform 150 may update one or more regular expressions for detecting protected data associated with the enterprise organization. For instance, such regular expressions may define certain characters, character sequences, words, and/or phrases that data filtering computing platform 150 should use in monitoring external code repository server infrastructure 160 and/or that data filtering computing platform 150 should use in identifying various different types of sensitive information that may be stored on external code repository server infrastructure 160.

In some embodiments, updating the one or more criteria for identifying the sensitive data of the enterprise organization based on the one or more features of the first source code received by the external code repository server infrastructure may include updating a machine learning classification model for detecting protected data associated with the enterprise organization. For example, in updating the one or more criteria for identifying the sensitive data of the enterprise organization based on the one or more features of the first source code received by the external code repository server infrastructure (e.g., external code repository server infrastructure 160) at step 316, data filtering computing platform 150 may update a machine learning classification model for detecting protected data associated with the enterprise organization. For instance, such a classification model may be constantly and/or iteratively updated by data filtering computing platform 150 with various different data points associated with various different features of sensitive data that has been previously detected and/or otherwise identified on external code repository server infrastructure 160. This model may, for instance, enable data filtering computing platform 150 to identify future cases of sensitive data being present on external code repository server infrastructure 160 based on the similarity in features between the future cases of sensitive data and the model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
receive, via the communication interface, from an enterprise administrator user computing device associated with an enterprise organization, configuration information defining one or more criteria for identifying sensitive data of the enterprise organization;
monitor external code repository server infrastructure based on the configuration information defining the one or more criteria for identifying the sensitive data of the enterprise organization;
based on monitoring the external code repository server infrastructure, detect that first source code received by the external code repository server infrastructure contains first sensitive information associated with the enterprise organization;
in response to detecting that the first source code received by the external code repository server infrastructure contains the first sensitive information associated with the enterprise organization, generate a notification comprising information indicating that the first sensitive information associated with the enterprise organization has been detected at the external code repository server infrastructure;
send, via the communication interface, to the enterprise administrator user computing device associated with the enterprise organization, the notification comprising the information indicating that the first sensitive information associated with the enterprise organization has been detected at the external code repository server infrastructure; and
after detecting that the first source code received by the external code repository server infrastructure contains the first sensitive information associated with the enterprise organization, update the one or more criteria for identifying the sensitive data of the enterprise organization based on one or more features of the first source code received by the external code repository server infrastructure,
wherein updating the one or more criteria for identifying the sensitive data of the enterprise organization based on the one or more features of the first source code received by the external code repository server infrastructure comprises updating a machine learning classification model for detecting protected data associated with the enterprise organization, and
wherein the machine learning classification model is iteratively updated by the computing platform with different data points associated with different features of enterprise data that has been previously detected on the external code repository server infrastructure.

2. The computing platform of claim 1, wherein receiving the configuration information defining the one or more criteria for identifying the sensitive data of the enterprise organization comprises receiving one or more first templates associated with exact matches of secure enterprise data and one or more second templates associated with close matches of secure enterprise data.

3. The computing platform of claim 1, wherein receiving the configuration information defining the one or more criteria for identifying the sensitive data of the enterprise organization comprises receiving at least one template for identifying user credentials associated with the enterprise organization.

4. The computing platform of claim 1, wherein receiving the configuration information defining the one or more criteria for identifying the sensitive data of the enterprise organization comprises receiving at least one template for identifying passwords associated with the enterprise organization.

5. The computing platform of claim 1, wherein receiving the configuration information defining the one or more criteria for identifying the sensitive data of the enterprise organization comprises receiving at least one template for identifying application programming interface (API) keys associated with the enterprise organization.

6. The computing platform of claim 1, wherein receiving the configuration information defining the one or more criteria for identifying the sensitive data of the enterprise organization comprises receiving at least one template for identifying proprietary algorithms associated with the enterprise organization or data patterns associated with the enterprise organization.

7. The computing platform of claim 1, wherein monitoring the external code repository server infrastructure comprises scanning incoming source code files received by the external code repository server infrastructure from one or more enterprise user computing devices.

8. The computing platform of claim 1, wherein detecting that the first source code received by the external code repository server infrastructure contains the first sensitive information associated with the enterprise organization comprises executing a false-positive filtering process on the first source code received by the external code repository server infrastructure.

9. The computing platform of claim 1, wherein detecting that the first source code received by the external code repository server infrastructure contains the first sensitive information associated with the enterprise organization comprises detecting that the first source code received by the external code repository server infrastructure contains the first sensitive information associated with the enterprise organization in near real-time as the first source code is received by the external code repository server infrastructure.

10. The computing platform of claim 1, wherein sending the notification comprising the information indicating that the first sensitive information associated with the enterprise organization has been detected at the external code repository server infrastructure comprises sending the notification comprising the information indicating that the first sensitive information associated with the enterprise organization has been detected at the external code repository server infrastructure in near real-time as the first source code is received by the external code repository server infrastructure.

11. The computing platform of claim 1, wherein the memory stores additional computer-readable instructions that, when executed by the at least one processor, cause the computing platform to:
generate a summary report comprising information associated with second sensitive information associated with the enterprise organization that has been detected at the external code repository server infrastructure; and
send, via the communication interface, to the enterprise administrator user computing device associated with the enterprise organization, the summary report comprising the information associated with the second sensitive information associated with the enterprise organization that has been detected at the external code repository server infrastructure.

12. The computing platform of claim 1, wherein the memory stores additional computer-readable instructions that, when executed by the at least one processor, cause the computing platform to:
after detecting that the first source code received by the external code repository server infrastructure contains the first sensitive information associated with the enterprise organization, initiate an automatic deletion process on the external code repository server infrastructure to remove the first sensitive information associated with the enterprise organization from the external code repository server infrastructure.

13. The computing platform of claim 1, wherein the memory stores additional computer-readable instructions that, when executed by the at least one processor, cause the computing platform to:
after detecting that the first source code received by the external code repository server infrastructure contains the first sensitive information associated with the enterprise organization, generate one or more commands directing the external code repository server infrastructure to hold the first source code for a manual review process and prevent one or more users from accessing the first source code until the manual review process is completed.

14. The computing platform of claim 1, wherein the memory stores additional computer-readable instructions that, when executed by the at least one processor, cause the computing platform to:
after detecting that the first source code received by the external code repository server infrastructure contains the first sensitive information associated with the enterprise organization, identify a first enterprise user computing device as a source of the first source code;
based on identifying the first enterprise user computing device as the source of the first source code, generate an alert for the first enterprise user computing device indicating that the first source code received by the external code repository server infrastructure contains the first sensitive information associated with the enterprise organization; and
send, via the communication interface, to the first enterprise user computing device, the alert generated for the first enterprise user computing device indicating that the first source code received by the external code repository server infrastructure contains the first sensitive information associated with the enterprise organization.

15. The computing platform of claim 1, wherein updating the one or more criteria for identifying the sensitive data of the enterprise organization based on the one or more features of the first source code received by the external code repository server infrastructure comprises updating one or more rules for detecting protected data associated with the enterprise organization.

16. The computing platform of claim 1, wherein updating the one or more criteria for identifying the sensitive data of the enterprise organization based on the one or more features of the first source code received by the external code repository server infrastructure comprises updating one or more regular expressions for detecting protected data associated with the enterprise organization.

17. A method, comprising:
at a computing platform comprising at least one processor, a communication interface, and memory:
receiving, by the at least one processor, via the communication interface, from an enterprise administrator user computing device associated with an enterprise organization, configuration information defining one or more criteria for identifying sensitive data of the enterprise organization;
monitoring, by the at least one processor, external code repository server infrastructure based on the configuration information defining the one or more criteria for identifying the sensitive data of the enterprise organization;
based on monitoring the external code repository server infrastructure, detecting, by the at least one processor, that first source code received by the external code repository server infrastructure contains first sensitive information associated with the enterprise organization;
in response to detecting that the first source code received by the external code repository server infrastructure contains the first sensitive information associated with the enterprise organization, generating, by the at least one processor, a notification comprising information indicating that the first sensitive information associated with the enterprise organization has been detected at the external code repository server infrastructure;
sending, by the at least one processor, via the communication interface, to the enterprise administrator user computing device associated with the enterprise organization, the notification comprising the information indicating that the first sensitive information associated with the enterprise organization has been detected at the external code repository server infrastructure; and
after detecting that the first source code received by the external code repository server infrastructure contains the first sensitive information associated with the enterprise organization, updating, by the at least one processor, the one or more criteria for identifying the sensitive data of the enterprise organization based on one or more features of the first source code received by the external code repository server infrastructure,
wherein updating the one or more criteria for identifying the sensitive data of the enterprise organization based on the one or more features of the first source code received by the external code repository server infrastructure comprises updating a machine learning classification model for detecting protected data associated with the enterprise organization, and
wherein the machine learning classification model is iteratively updated by the computing platform with different data points associated with different features of enterprise data that has been previously detected on the external code repository server infrastructure.

18. One or more non-transitory computer-readable media storing instructions that, when executed by a computing platform comprising at least one processor, a communication interface, and memory, cause the computing platform to:
receive, via the communication interface, from an enterprise administrator user computing device associated with an enterprise organization, configuration information defining one or more criteria for identifying sensitive data of the enterprise organization;
monitor external code repository server infrastructure based on the configuration information defining the one or more criteria for identifying the sensitive data of the enterprise organization;
based on monitoring the external code repository server infrastructure, detect that first source code received by the external code repository server infrastructure contains first sensitive information associated with the enterprise organization;
in response to detecting that the first source code received by the external code repository server infrastructure contains the first sensitive information associated with the enterprise organization, generate a notification comprising information indicating that the first sensitive information associated with the enterprise organization has been detected at the external code repository server infrastructure;
send, via the communication interface, to the enterprise administrator user computing device associated with the enterprise organization, the notification comprising the information indicating that the first sensitive information associated with the enterprise organization has been detected at the external code repository server infrastructure; and
after detecting that the first source code received by the external code repository server infrastructure contains the first sensitive information associated with the enterprise organization, update the one or more criteria for identifying the sensitive data of the enterprise organization based on one or more features of the first source code received by the external code repository server infrastructure,
wherein updating the one or more criteria for identifying the sensitive data of the enterprise organization based on the one or more features of the first source code received by the external code repository server infrastructure comprises updating a machine learning classification model for detecting protected data associated with the enterprise organization, and
wherein the machine learning classification model is iteratively updated by the computing platform with different data points associated with different features of enterprise data that has been previously detected on the external code repository server infrastructure.

19. The method of claim 17, wherein receiving the configuration information defining the one or more criteria for identifying the sensitive data of the enterprise organization comprises receiving one or more first templates associated with exact matches of secure enterprise data and one or more second templates associated with close matches of secure enterprise data.

20. The method of claim 17, wherein receiving the configuration information defining the one or more criteria for identifying the sensitive data of the enterprise organization comprises receiving at least one template for identifying user credentials associated with the enterprise organization.

* * * * *